United States Patent [19]

Fujita et al.

[11] Patent Number: 5,176,734
[45] Date of Patent: Jan. 5, 1993

[54] GRANULAR FERTILIZER WITH A DECOMPOSABLE COATING AND PROCESS FOR PRODUCING THE SAME

[75] Inventors: Toshio Fujita; Yoshisato Yamashita; Shigemitsu Yoshida; Katsutoshi Yamahira, all of Minamatashi, Japan

[73] Assignee: Chisso Corporation, Osaka, Japan

[21] Appl. No.: 704,194

[22] Filed: May 22, 1991

Related U.S. Application Data

[63] Continuation of Ser. No. 77,514, Jul. 24, 1987, abandoned.

[51] Int. Cl.$^5$ .................. C05G 3/00; C05G 3/10
[52] U.S. Cl. ........................................ 71/11; 71/27; 71/64.02; 71/64.11; 71/64.12; 71/64.13
[58] Field of Search ............... 71/1, 11, 27, 64.01, 71/64.02, 64.07, 64.11, 64.12, 64.13

[56] References Cited

PUBLICATIONS

Kirk-Othmer Encyclopedia, 3rd Edition, vol. 13, 1981, pp. 97-98.

Primary Examiner—Ferris Lander
Attorney, Agent, or Firm—Fred Philpitt

[57] ABSTRACT

A granular fertilizer with a coating which is decomposable by soil microorganisms, preferably a coating which is decomposed and degraded both on the surface layer of the soil and in the soil, and a process for producing the granular fertilizer, which coating contains a poly 3-hydroxy-3-alkylpropionic acid as an indispensable ingredient, and if necessary, a resin or a low-molecular resin and further, if necessary, an inorganic or organic powder, and which process comprises adding an organic solvent solution of the poly 3-hydroxy-3-alkylpropionic acid, and if necessary, the resin, and if necessary the powder (dispersed in the solution) to a granular fertilizer in fluided state in the form of spray, and when added, blowing a high speed hot air stream onto the fertilizer to thereby instantaneously remove the solvent and also dry the resulting fertilizer.

18 Claims, 7 Drawing Sheets

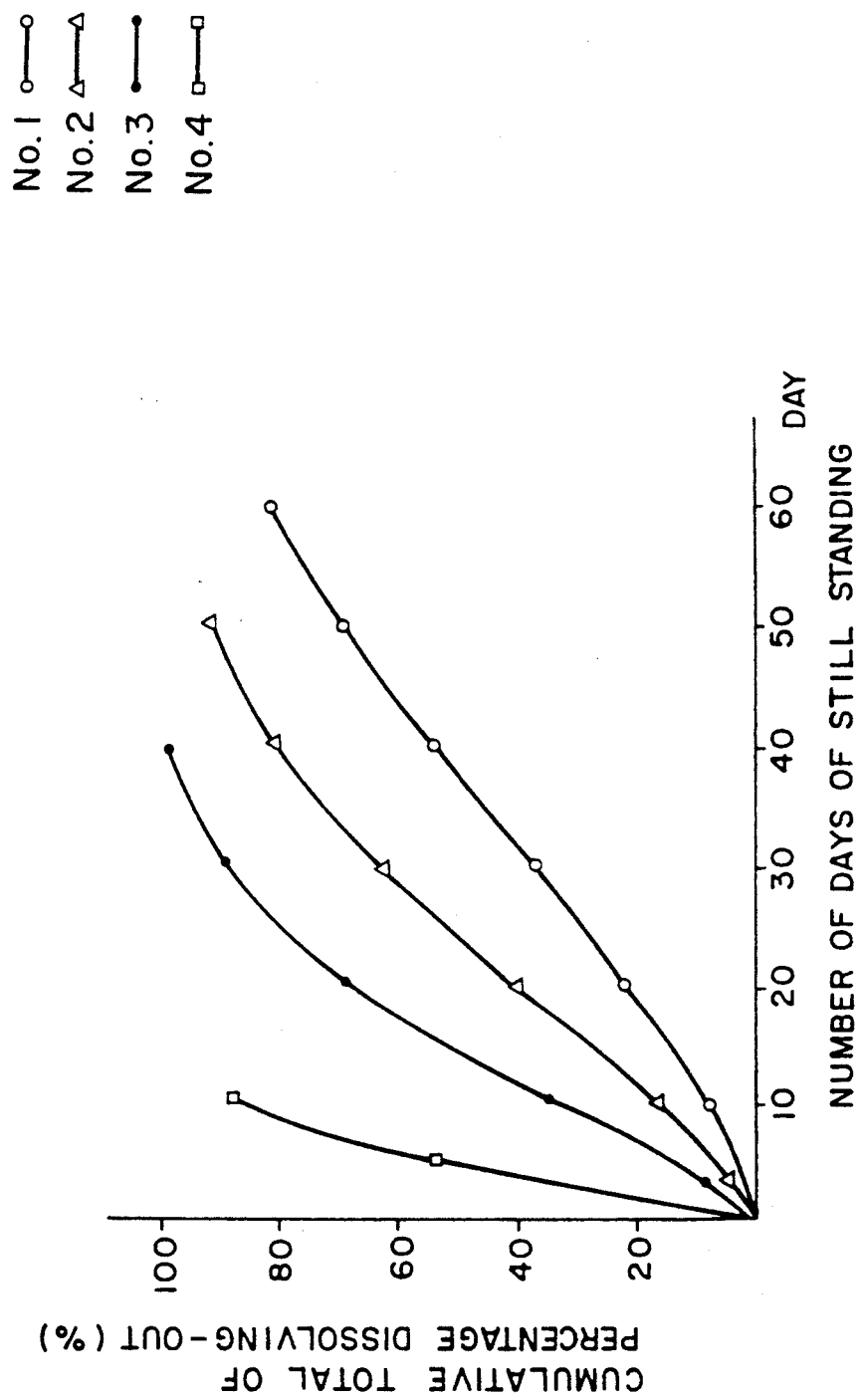

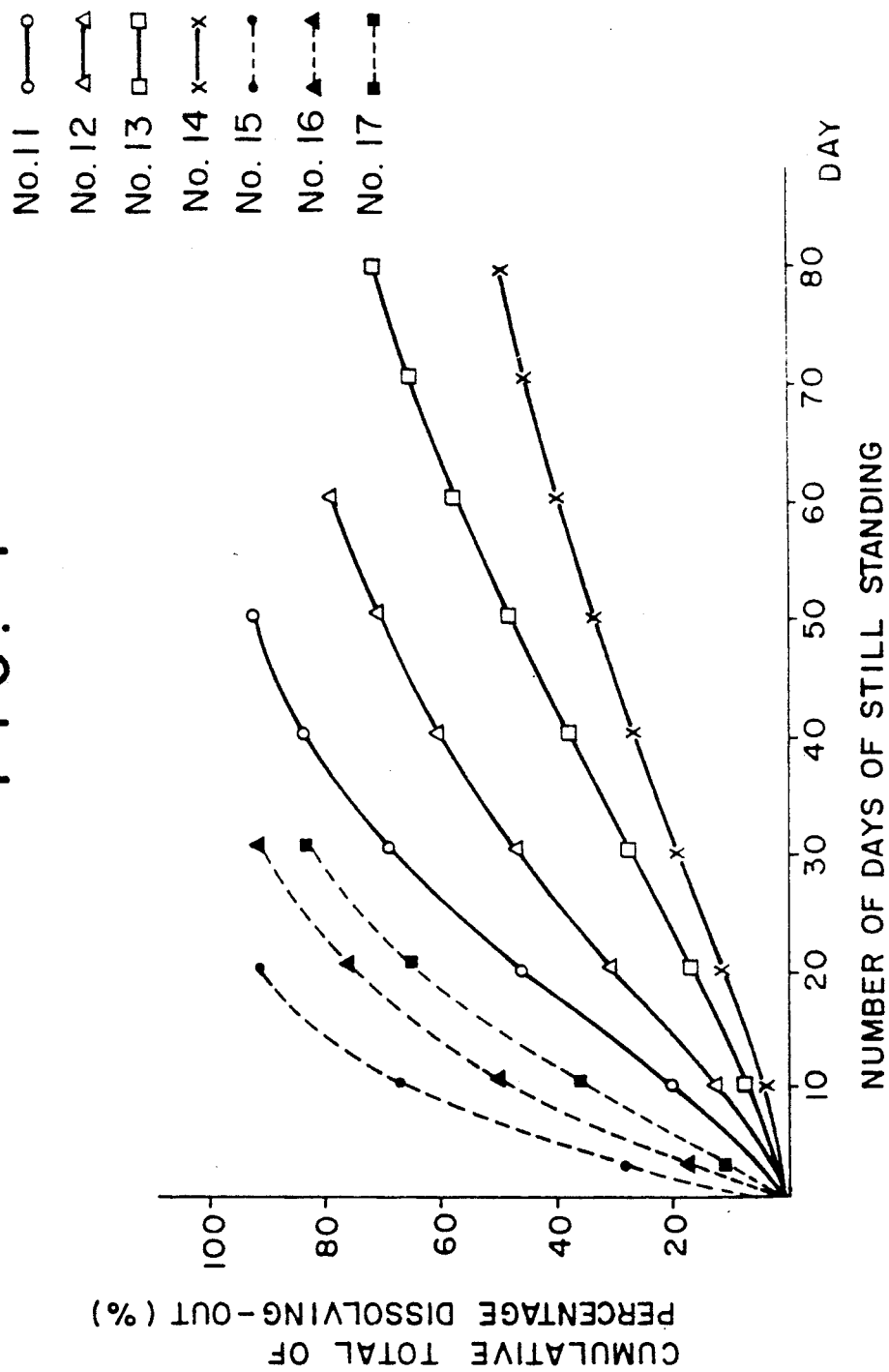

GRANULAR FERTILIZER WITH A DECOMPOSABLE COATING AND PROCESS FOR PRODUCING THE SAME

This is a continuation of application Ser. No. 07/77,514, filed July 24, 1987 and now abandoned and the benefits of 35 USC 120 are claimed relative to it.

BACKGROUND OF THE INVENTION

1. Field of the Invention

This invention relates to a granular fertilizer with a decomposable coating and a process for producing the same. More particularly it relates to a granular fertilizer with a decomposable coating containing a poly-3-hydroxy-3-alkylpropionic acid as an indispensable component thereof and if necessary, a light-decomposable resin, and a process for producing the same.

As to the coating of the fertilizer of the present invention, the 3-hydroxy-3-propionic acid polymer contained in the coating is decomposed mainly by microorganisms in the soil, while the photo-degradative resin component contained in the coating is degraded mainly by light on the surface layer of the soil hence after application of the product of the present invention, the coating remains neither in the soil nor on the surface layer of the soil. Further, it is possible to add various adjuvants or agents to the coating of the present invention for adjusting the dissolving-out of the granular fertilizer.

2. Description of the Related Art

Various researches have so far been made in order to cause the dissolving-out of the fertilizing component contained in granular fertilizers applied to the soil to correspond to the needs of crops accompanying their growth, or in order to prevent the moisture absorption or caking of granular fertilizers during their current process. One of such researches is directed to a process of coating the surface of granular fertilizers with high-molecular compounds. For this coating, either of thermosetting or thermoplastic resins have been used. However, coating with such high-molecular compounds has raised various problems as described below.

As to processes using thermosetting resins, the following resins have been disclosed:

for example, styrenized alkyld resins and phenolic resins (British patent No. 954,555), fatty oil-modified alkyd resins, fatty oil-dicyclopentadiene copolymers and diisocyanate-modified fatty oil polymers (Japanese patent publication No. Sho 40-28,927/1965), phenolic resins (Japanese patent publication No. Sho 44-28,457/1969), etc.

Further as to processes using thermoplastic resins, the following resins have been disclosed:

for example, polystyrene, polyvinyl chloride, polyvinylidene chloride, polyacrylonitrile, polyethylene and polyfluorinated alkanes or copolymers consisting of two or more constituting unit monomers of the foregoing (British patent 815,829) and emulsion-polymerized vinyl acetate liquid (Japanese patent publication No. Sho 37-15,832/1962).

When high-molecular compounds, particularly thermoplastic resin solutions or their emulsion-polymerized liquids are used as the coating material, the following problem has been raised:

Japanese patent publication No. Sho 42-13,681/1967 discloses that when the surface of granular products are coated with a liquid resin or a stringing resin, coating with only several percentages of such resins causes particles to adhere to one another to form a block, not individual granules; hence uniform and thick coating is difficult.

Japanese patent application laid-open Nos. Sho 50-99,858/1975, Sho 51-75,674/1976 and Sho 53-98,265/1978, each directed to a process for coating granular fertilizers, previously invented by the present inventors, disclose that the properties of the resin solution and choice of drying conditions cause no blocking during the coating process and coating is effected by way of a simple process and efficiently.

Japanese patent application laid-open No. Sho 50-99,858/1975 discloses a process for coating granular fertilizers wherein, when granular fertilizers are coated with a coating material composed mainly of polyolefins, a solution of the coating material is sprayed on granular fertilizers and at the same time with the coating, the coated material is dried by a high speed hot air stream. The specific feature of the process consists in that (1) it is possible to have an extremely thin and uniform coating and also (2) it is possible to adjust the dissolving-out rate of the fertilizing component by dispersing a surfactant as an agent for adjusting the dissolving-out rate in the coating.

Japanese patent application laid-open No. Sho 51-75,674/1976 discloses that vinylidene chloride polymer resins and an ethylene-vinyl acetate copolymer, the vinyl acetate content of which is 5% by weight or less, can coat granular fertilizers uniformly and extremely thinly as in the case of use of polyolefin resins.

Japanese patent publication No. Sho 60-37,074/1985 discloses that coating of granular fertilizers with polyolefin resins, ethylene-vinyl acetate copolymer and a surfactant can control the dissolving-out of the fertilizing component with a high stability.

Further, Japanese patent publication No. Sho 60-3,040/1985 and Japanese patent application laid-open No. Sho 55-1,672/1980 disclose that when mineral powder such as talc or sulfur is dispersed in the coating of the above-mentioned polyolefin resins, etc., the function of controlling the dissolving-out is kept and also the degradation and decomposition of the remaining capsule after the dissolving-out are promoted.

Such a series of coating techniques developed by the present inventors have been further developed and practically employed for coating granular urea or chemical compounds and the resulting products have come to be broadly used as fertilizers superior in control of the dissolving-out. As to these fertilizers, while the dissolving-out can be continuously controlled over several hours to several years without varying the thickness of the coating, the dissolving-out basically exhibits a slow-release pattern and the capsule remaining after the dissolving-out of the fertilizing component is deteriorated or decomposed by light or oxygen. However, appearance of a coated granular fertilizer has been desired by the consumers, which fertilizer is of the slow release type coated with a more microorganism-decomposable material or those of time capsule type, the capsule of which is rapidly decomposed by microorganisms after the dissolving-out of the fertilizing component.

In view of these situations, the present inventors have done extensive research directed to a slow-release type fertilizer which is based on a microorganism-decomposable material and optionally controllable and a time capsule type fertilizer which does not dissolve out during a definite period, but thereafter dissolves out during a short period, and as a result have found the present invention.

We have confirmed that poly 3-hydroxy-3-alkylpropionic acids, particularly those wherein the alkyl group thereof is methyl or ethyl, are microorganism-decomposable, and, in order to carry out the present invention, the polymers have been dissolved in various solvents and coating has been carried out with solutions. In the case of some of the solvent solutions that were added in spray form, the coating material became adhesive and particles during the coating adhered to one another; hence it was impossible to coat single particles. Further, in the case of others, a tough coating specific of high-molecular compounds could not be obtained. As a result of trial and error, according to the following process referring to a coating process invented by the present inventors and disclosed in Japanese patent application laid-open No. Sho 50-99,858/1975, it has been possible to uniformly coat single particles; thus the process of the present invention has been found.

In order to complete these techniques, a high-molecular material satisfying all of the following (1) to (5) should be found:

(1) the material is a tough high-molecular material which is easily decomposed by soil microorganisms;
(2) it is possible to develop a coating-process technique wherein the material is used;
(3) the product obtained by coating process with the material can control the dissolving-out;
(4) when the material is made composite with other materials, it is possible to control the dissolving-out rate within a broad range; and
(5) even under conditions where the material is attacked by soil microorganisms in the soil, control of the dissolving-out is possible.

At the initial stage of such investigate research, various high-molecular materials were investigated and chosen, and evaluation was made as to whether or not the materials embedded in the soil were decomposed by soil microorganisms. As a result it has been found that among the high-molecular materials, several kinds were decomposed. Various coating processes were examined using these decomposable materials. However, it was impossible for most of the materials to carry out a uniform coating process endurable to control of the dissolving-out. Even in the case of materials by the use of which a coating process affording a uniform coating was possible, most of these materials could not be practically used in view of evaluations of the physical properties of the coating and test of dissolving-out in water.

It has been confirmed by a test of dissolving-out in water that when materials screened here are combined with other materials and the combinations are used as a composite material, such a composite material can control the dissolving-out rate within a broad range.

These materials were further subjected to a test of dissolving-out in the soil under conditions where they were decomposed by soil microorganisms.

When these materials were converted into composite materials, for example if high-molecular materials were occupied by a large proportion of a microorganism-non-decomposable high-molecular material, some of the materials were found to inhibit the decomposition of the capsule itself in the soil, but these have been usable as the current slow-release type dissolving-out fertilizers. As described above, the present invention has been achieved as a result of research and development directed to various technical problems over a long time.

SUMMARY OF THE INVENTION

As apparent from the foregoing, the object of the present invention is to provide a granular fertilizer with a coating which is decomposable by soil microorganisms, preferably a coating which is decomposed and degraded both on the surface layer of the soil and in the soil, and a process for producing the granular fertilizer.

The present invention in two aspects has the following main constitutions (1) and (8) and constitutions as embodiments (2) to (7) and (9) to (12):

(1) A granular fertilizer with a decomposable coating comprising a poly 3-hydroxy-3-alkylpropionic acid as an active ingredient.
(2) A granular fertilizer according to item (1) wherein said alkyl is methyl group or ethyl group.
(3) A granular fertilizer according to item (1) wherein said decomposable coating comprises said poly 3-hydroxy-3-alkylpropionic acid and at least one member selected from the group consisting of as resins, polyvinylidene chloride, olefin polymer resins, rubbery resins, ethylene-vinyl acetate copolymer, polystyrene, polymethyl methacrylate, ethylene-carbon monoxide copolymer, ethylene-vinyl acetate-carbon monoxide terpolymer, ethylene-ethyl acrylate copolymer and ethylenemethacrylic acid copolymer and as low molecular resinous substances, paraffin, hardened oils, solid fatty acids, metal salts thereof, beeswax, Japan wax, petroleum resins and rosins.
(4) A granular fertilizer according to item (1) wherein said decomposable coating further comprises an inorganic or organic, difficultly water-soluble or water-insoluble powder.
(5) A granular fertilizer according to item (3) wherein said decomposable coating further comprises an inorganic or organic, difficultly water-soluble or water-insoluble powder.
(6) A granular fertilizer according to item (4) wherein said inorganic powder is powder of talc, clay, silica, diatomaceous earth, metal oxides or sulfur and said organic powder is powder of starch or crotylidene diurea.
(7) A granular fertilizer according to item (5) wherein said inorganic powder is powder of talc, clay, silica, diatomaceous earth, metal oxides or sulfur and said orgnaic powder is powder of starch or crotylidene diurea.
(8) A process for producing a granular fertilizer with a decomposable coating which process comprises adding an organic solvent solution of a poly 3-hydroxy-3-alkylpropionic acid to a granular fertilizer in fluidized state in the form of spray, and when added, blowing a high speed hot air stream onto said granular fertilizer to thereby instantaneously remove the solvent contained in said organic solvent solution and also dry the resulting fertilizer.
(9) A process according to item (8) wherein in said organic solvent solution are dissolved said poly-3-hydroxy-3-alkylpropionic acid and at least one member selected from the group consisting of as resins, polyvinylidene chloride, olefin polymer resins, rubbery resins, ethylene-vinyl acetate copolymer, polystyrene, polymethyl methacrylate, ethylene-carbon monoxide copolymer, ethylene-vinyl acetate-carbon monoxide terpolymer, ethylene-ethyl acrylate copolymer and ethylene-methacrylic acid copolymer and as low molecular resinous substances, paraffin, hardened oils, solid fatty acids, metal salts thereof, beeswax, Japan wax, petroleum resins and rosins.

(10) A process according to item (8) wherein in said organic solvent solution is further mixed and dispersed an inorganic or organic, difficultly water-soluble or water-insoluble powder.

(11) A process according to item (9) wherein in said organic solvent solution is further mixed and dispersed an inorganic or organic, difficultly water-soluble or water-insoluble powder.

(12) A process according to item (10) wherein said inorganic powder is powder of talc, clay, silica, diatomaceous earth, metal oxides or sulfur and said organic powder is powder of starch or crotylidene diurea.

BRIEF DESCRIPTION OF DRAWINGS

FIGS. 2 to 6 each show a chart illustrating Examples of the present invention.

DETAILED DESCRIPTION OF PREFERRED EMBODIMENTS

Figure 1:
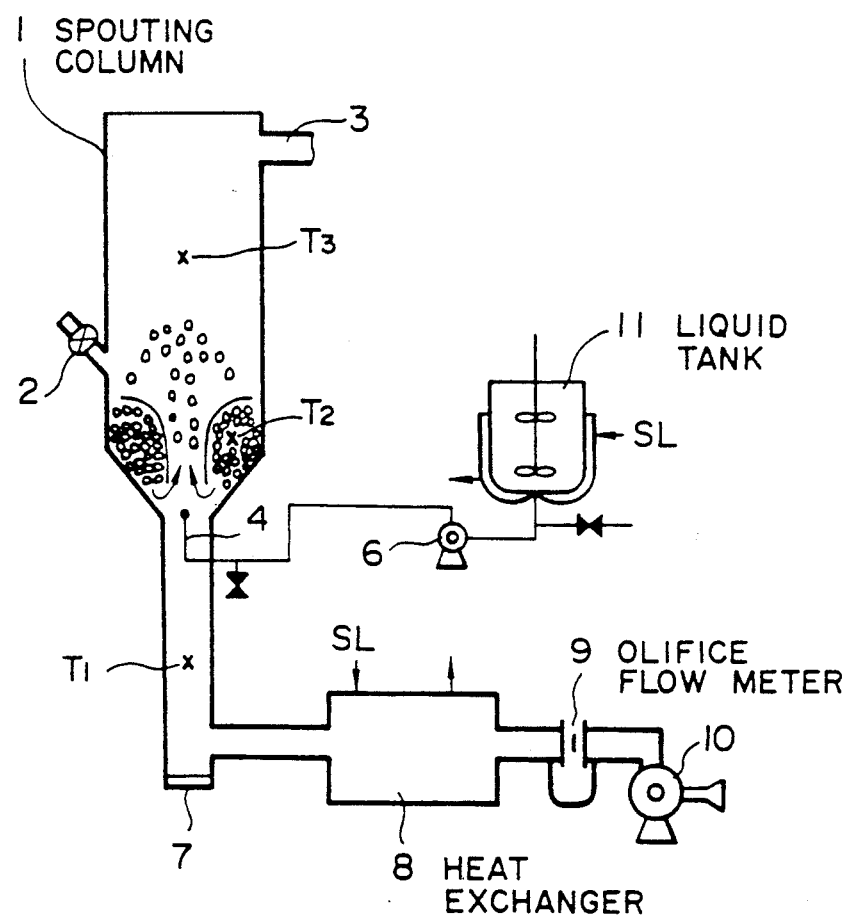
FIG. 1 shows a flowsheet illustrating an apparatus used in the process of the present invention.

The constitution and effectiveness of the present invention will be described below in more detail.

The present invention is characterized in using a poly 3-hydroxy-3-alkylpropionic acid (chemical structure (I)) as a soil microorganism-decomposable high-molecular material for forming a decomposable coating, and particularly preferred examples of the above material are poly 3-hydroxy-3-methylpropionic acid (chemical structure (II)), poly 3-hydroxy-3-ethylpropionic acid (chemical structure (III)) and a copolymer of 3-hydroxy-3-methylpropionic acid with 3-hydroxy-3-ethylpropionic acid (chemical structure (IV)). These basically have the following chemical structures, but the bonding manner of the copolymer (IV) may be either random or block manner. The molecular weights of such polymers or copolymer have no particular limitation, but are usually in the range of 10,000 to 2,000,000, preferably 50,000 to 1,000,000.

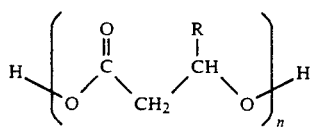
(I)

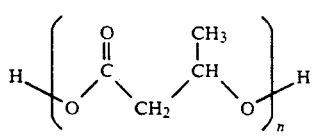
(II)

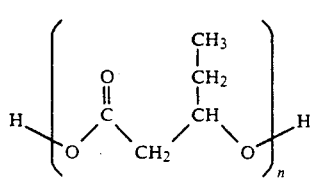
(III)

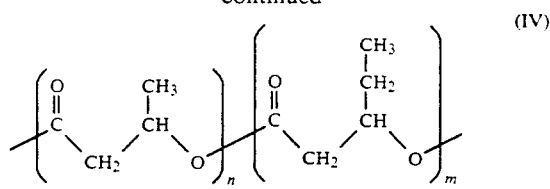
(IV)

As to the granular fertilizer of the present invention, even when the fertilizer is coated by these poly 3-hydroxy-3-alkylpropionic acid materials, a sufficient dissolving-out-controlling function is obtained. For example, the endurability of the dissolving-out is exhibited over several ten days in the case of urea having high values of deliquescence and solubility, and over several hundred days in the case of potassium sulfate or the like having low values of the above physical properties. In the case where the dissolving-out is promoted by using these single materials, if a surfactant is dispersed in the coating to be formed i.e. capsule or a powder is dispersed therein as a filler, it is possible to control the extent of the promotion in accordance with the quantity thereof dispersed. According to these processes, however, while the dissolving-out period can be shortened as compared with use of the single materials, it is difficult to extend the period.

As to the surfactant usable in the present invention, any of cationic ones, anionic ones, amphoteric ones and nonionic ones are usable, but it is important that the balance between hydrophilic nature and hydrophobic nature i.e. the HLB value is in a suitable range. If the hydrophylic nature is too strong, the surfactant is not uniformly dispersed in the coating, but agglomerates and becomes a cause of forming coating defects. Surfactants having a highly oleophilic nature have no influence upon the coating, but there is a tendency that the effectiveness of promoting the dissolving-out is somewhat inferior. The HLB of these surfactants is 15 or less, preferably in the range of 11 to 13.

The powder as a filler used in the present invention is a difficultly water-soluble or water-insoluble powder and either of inorganic or organic materials are usable, but the particle diameter thereof is preferred to be half or less of the coating thickness (20 to 200 μ), preferably ¼ thereof. While these fillers are uniformly dispersed in the coating, those having an inferior dispersibility require a treatment for improving the dispersibility such as surface treatment with silicone or the like or treatment of making the dispersing easy with surfactants or the like. Preferred examples of such inorganic powder are powder of talc, calcium carbonate, clay, diatomaceous earth, silica, metal silicates, metal oxides, sulfur, etc. Among such inorganic powder, sulfur is a material susceptible of microorganism decomposition; hence it has an advantage of making the coating easily susceptible of its decomposition in the soil as a component of the composite material of the coating. On the other hand, as to the organic powder, while it is inferior to the inorganic powder in the aspect of filler, a number of the powders are easily susceptible of decomposition by microorganisms; hence there is an advantage that it is superior to sulfur in the aspect of decomposition in the soil as a component of composite materials. Examples of preferred materials among these are starch, starchy materials, slow-release nitrogen fertilizers such as crotylidene diurea (abbreviation of 2-oxo-4-methyl-6- ureidohexahydropyrimidine) which forms $NH_4^+$ through decomposition by microorganisms in the soil, etc. When these powders are used as filler, if the quantity thereof used increases, there is a tendency of reducing the coating strengths even when any powders are used.

Another process of controlling the dissolving-out of the fertilizing component in the present invention resides in simultaneous use of other high-molecular materials or waxes as a material for forming the decomposable coating to thereby make the coating composite. This process is particularly effective in the case where the dissolving-out is retarded, as compared with the case where poly 3-hydroxy-3-alkylpropionic acid materials are singly used, but the above materials for making the coating composite also can promote the dissolving-out depending on the choice thereof. These processes may be employed together with the first process wherein a surfactant or a filler is blended to exhibit the promoting effectiveness, and these processes are very often preferred. The term "decomposable coating" referred to herein means a coating having a nature of being deteriorated by light or oxygen and continuing to degrade, and also being degraded by soil microorganisms.

A light-degradative resin composition as one of materials constituting the decomposable coating refers to resin compositions comprising at least one member selected from the group consisting of ethylene-carbon monoxide copolymer, ethylene-carbon monoxide-vinyl acetate terpolymer, polybutadiene, polyisoprene, styrene-butadiene copolymer and styrene-isoprene copolymer. Any of these compositions exhibit a nature of being deteriorated by light or oxygen and continuing to degrade. The ethylene-carbon monoxide-vinyl acetate termpolymer refers to any of terpolymers consisting of ethylene, carbon monoxide and vinyl acetate, and a composition containing 0.1 to 15% by weight of carbon monoxide and 1 to 40% by weight of vinyl acetate is preferably used.

As to the polybutadiene, any of those of 1,4 bonding type generally used for synthetic rubbers and those of 1,2 bonding type having a high crystallinity are usable.

As to the styrene-butadiene copolymer and styreneisoprene copolymer, any of those of random copolymerization type and block copolymerization type are usable.

Next, as to the mixing proportions of 3-hydroxy-3-alkylpropionic acid polyer as the indispensable constituent of the coating of the fertilizer of the present invention and a light-degradative resin composition, when the material for molding the coating consists only of these two kinds, the ratio by weight of 3-hydroxy-3-alkylpropionic acid polymer to the light-degradative resin composition is in the range of 0.1 to 0.9, preferably 0.3 to 0.7.

If the ratio is less than 0.1, the decomposition by microorganisms is insufficient, while if it exceeds 0.9, the decomposition and degradation by light or oxygen is insufficient.

Examples of the material for decomposable coating usable together with poly 3-hydroxy-3-alkyl propionic acids are polyvinylidene chloride and copolymers of vinylidene chloride, polyolefin resins, ethylene-carbon monoxide copolymer, ethylene-vinyl acetate copolymer, ethylene-vinyl acetate-carbon monoxide terpolymer, ethylene-ethyl acrylate copolymer, ethylene-methacrylic acid copolymer, rubbery resins, polystyrene, polymethyl methacrylate, etc. Among these, high-molecular materials such as polyvinylidene chloride, copolymers of vinylidene chloride, polyolefin resins, ethylene-carbon monoxide copolymer, etc. are preferable materials for the purpose of retarding the dissolving-out.

On the other hand, examples of high-molecular materials for promoting the dissolving-out are particularly ethylene-vinyl acetate copolymer having a high content of vinyl acetate (40% by weight or more) among ethylene-vinyl acetate copolymers and particularly natural rubber, polyisoprene, polybutadiene, styrenebutadiene random copolymer and styrene-isopropylene copolymer among rubbery resins.

On the other hand, examples of waxy materials which are preferred to be used for making the coating composite, are paraffin, solid fats and oils, particularly hardened oils, solid fatty acids and divalent or trivalent metal salts thereof, beeswax, Japan wax, rosins, petroleum resins, etc. and these are materials for retarding the dissolving-out. The proportion of such waxy materials blended in the coating composition is 30% by weight or less, preferably 20% by weight or less based on the weight of the high-molecular resin contained in the coating composition.

As to the coating material of the coated granular fertilizer of the present invention, it is possible to use additives described below thereto. In order to control the extent of controlling the decomposition and degradation by light and oxidation, ultraviolet absorber and stabilizers are used if necessary. The kind thereof has no particular limitation, but those which suitably bleed onto the surface of the coating and are thereby removed to such an extent that the decomposability and degradativity thereof are not damaged.

Further, in order to inhibit the decomposition of the coating by microorganisms and also control the dissolving-out properties in the soil, bactericides or mildew-proofing agents are used if necessary.

Besides, known additives such as surfactants, surface additives for imparting hydrophilic properties, etc. may be used.

According to the present invention, it is possible to produce coated granular fertilizers using poly 3-hydroxy-3-alkylpropionic acid materials as the coating materials thereof and having various functions. The granular fertilizer used as the core substances thereof are much varied in the aspect of the components, particle diameter, shape, etc., and even when the same function is imparted, the coating state should be varied depending on the kind, particle diameter and shape of the fertilizer. For example, while the practical coating thickness of the coated granular fertilizer of the present invention is in the range of 20 to 200 $\mu$, the percentage coating for retaining such coating thickness is greatly varied depending on the particle diameter (particle size) and the shape. If such coating thickness is less than 20 $\mu$, it is difficult to sufficiently control the dissolving-out, while a case where a coating thickness exceeding 200 $\mu$ is required, scarcely occurs. In addition, the coating thickness is usually in the range of 20 to 120 $\mu$ in the case of known slow-release type fertilizers and in the range of 80 to 200 $\mu$ in the case of time capsule type fertilizers.

Further, as to setting of the dissolving-out period, the properties of the granular fertilizer as a core substance have a great influence upon the period. Even when fertilizers having the same particle diameter and shape are used and the coating compositions are the same and also the coatings are the same, there often occur differences of ten times or more between the duration periods of the dissolving-out, depending on the kind of the fertilizers (e.g. urea, potassium sulfate, etc.).

When the coated granular fertilizers of the present invention are designed, the kind, particle diameter and shape of the fertilizers as a core substance are first determined, and then the coating thickness and the percentage coating are set. Thereafter the durability of the dissolving-out of the slow-release type fertilizers under these specified conditions is examined. As to the method therefor, one or combinations of the above-mentioned four kinds of materials i.e. surfactants, fillers, specified high-molecular materials and waxes are possible and there are a number of combinations thereof capable of affording the same durability.

For example, in order to obtain a coating having the same function of dissolving-out durability as that of a coating consisting only of poly 3-hydroxy-3-alkylpropionic acids, a substance for retarding the dissolving-out such as high-molecular materials e.g. polyethylene or waxes e.g. hardened oils is first mixed with a poly 3-hydroxy-3-alkylpropionic acid material to obtain a composition having an enhanced dissolving-out durability, to which a filler or a surfactant is then added to promote the dissolving-out, whereby it is possible to obtain a coating having the same extent of the function of dissolving-out duration as that of the poly 3-hydroxy-3-alkylpropionic acid material.

As described above, there are numberless combinations as far as the function of dissolving-out duration alone is concerned, but such combinations are restricted in the aspect of other properties.

A first restriction is directed to the coating strength. If the proportion of a filler exceeds 80% by weight based on the weight of the coating, the coating strength often lowers so that the coating is damaged when the fertilizer is handled as a general-purpose fertilizer, to damage the function of controlling the dissolving-out. Similarly, if the proportion of waxes such as paraffin, hardened oils, etc. used as an agent for retarding the dissolving-out exceeds 50% by weight based on the weight of other high-molecular materials, a problem is raised in the aspect of the coating strength.

A second restriction is directed to the micro-organism-decomposability of the coating. If a large quantity of microorganism-non-decomposable high-molecular compounds is contained in the coating, the decomposition of the coating is hindered. While this is varied depending on the presence or absence of the microorganism-decomposable filler and its quantity, the proportion of the microorganism-non-decomposable resins should be restricted to 40% by weight or less based on the weight of the high-molecular materials in the case of absence of the filler, while the proportion should be restricted to at most 60% by weight based on the weight of the high-molecular materials even in the case of use of the microorganism-decomposable filler.

The coated granular fertilizer of the present invention is coated by a microorganism-decomposable coating and affected by soil microorganisms; hence its dissolving-out particularly in the soil having a high microorganism activity tends to be faster than its dissolving-out in water. Such a tendency can be controlled by (1) increase in the proportion of the microorganism-non-decomposable materials, (2) simultaneous use of bactericides and (3) coating of its surface with an extremely thin protective film, but it is difficult to have the fertilizer coated by the microorganism-decomposable coating had all the same function as that of the fertilizer coated by the microorganism-non-decomposable coating. The product of the present invention, however, is useful as a dissolving-out-controlling fertilizer for the present agriculture, and has a very great meaning in that it is a dissolving-out-controlling fertilizer with microorganism-decomposable high-molecular material, found for the first time in the world.

Further, according to the present invention, it is also possible to produce a time capsule type fertilizer wherein the dissolving-out is restricted by making the coating thickness larger than that of slow-release type fertilizers and after a certain period, the coating is broken by decomposition with microorganisms and the total quantity of the fertilizing component dissolves out within a short period. The period within which the dissolving-out is restricted can be controlled to a certain extent in the case of known products, by the above-mentioned means (1), (2) and (3) for inhibiting the decomposition, but this is not yet complete. However, the present invention also has a meaning in that it gives access to a completely controlled time capsule type fertilizer.

The present invention is applicable to granules containing all kinds of fertilizing components, and particularly effective for fertilizers comprising single substances or two or more components thereof useful as water-soluble fertilizers such as ammonium sulfate, ammonium chloride, ammonium nitrate, urea, potassium chloride, potassium sulfate, potassium nitrate, sodium nitrate, ammonium phosphate, potassium phosphate, calcium phosphate, etc. Further when the present invention is applied to difficultly soluble fertilizers such as OMUP (crotylidene diurea), IBDU (isobutylidene diurea), oxamide, etc., it is possible to extend the effective period of these fertilizers.

The coating material for the process of the present invention is dissolved or dispersed in an organic solvent and used. The solvent used therefor is selected from those which dissolve high-molecular materials or waxes and also dissolve, while hot, poly 3-hydroxy-3-alkylpropionic acid materials indispensable for the present invention, but deposit, while cold, the high-molecular materials in the form of fine crystals, and become white-turbid but form a jelly form.

As to the solution for these coatings or the solution further having a definite filler dispersed therein, it is an indispensable condition that these solutions are kept at high temperatures so that the high-molecular materials in the solutions cannot be deposited or become a jelly form and also are blown onto the granular fertilizer in spray form together with a high speed hot air stream to thereby instantaneously vaporize off the solvent and also dry the fertilizer.

Adequate choice of the solvent used in the process of the present invention is a necessary condition for preventing particles from blocking to one another due to adhesive properties of the high-molecular materials during coating into a cake form. Further, the instantaneous drying by the high speed hot air stream is a necessary condition for avoiding that high-molecular materials are deposited during the course of the vaporization, cooling and concentration of the solutions, to thereby hinder coating formation intrinsic of the high-molecular materials. Concrete examples of such a solvent are toluene, xylene, ethyl acetate, trichloroethylene, chloroform, benzyl chloride, etc.

The product of the present invention is obtained under such choice of solvent and drying conditions, and the speed of the hot air stream spouted together with the coating solution is necessary to be 10 m/sec or higher, preferably 15 m/sec or higher.

When powder is used as a filler in the coating of the present invention, it is necessary to forcibly agitate the organic solvent solution in a vessel for dissolving the coating materials or the like means so that the powder can be uniformly mixed in the solution without being precipitated or floating onto the solution. As to the thus obtained coating solution, it is necessary to adjust the viscosity of the coating material so as to give a viscosity of 50 cp or less depending on the temperature employed. If the viscosity exceeds 50 cp, even when the solvent is chosen as above, partial blocking of particles of the granular fertilizer cannot be avoided and hence in such case, it is necessary to dilute the solution for use.

As the apparatus for carrying out coating while retaining the conditions of the process of the present invention, a spouting layer apparatus is optimum and most recommended. The general shape of the spouting layer apparatus is of an inverted cone type at the bottom part and has an air-spouting port at its lowest part. Particles are placed in the vessel of the apparatus and when hot air is spouted from the spouting port, the particles are spouted upwards, drop in the vessel and again spouted in recycle manner. When a spray nozzle for the coating solution is provided at the spouting port and the coating solution is sprayed onto the spouted particles, the product of the present invention is easily obtained. The particle temperature at that time during coating is kept at an upper limit temperature at which the high-molecular materials cause no melt-adhesion or the coating is not damaged.

The present invention will be described in more detail by way of Examples.

EXAMPLE 1

(1) Choice of solvent used in the process of the present invention

Poly (3-hydroxy-3-methylpropionic acid) (molecular weight: 750,000) (0.3 g) and a solvent to be tested (30 ml) are placed in a large test tube and the tube is placed in an oil bath, followed by gradually raising the temperature (1° C./min. as a criterion) with stirring to dissolve it in the solvent. At that time, when a symptom of dissolution is observed, the temperature-raising speed is slowed to detect the dissolution temperature. On complete dissolution, agitation is stopped, followed by taking out the tube from the oil bath and gradually allowing it to cool down. At this gradual cooling step, there is observed a substance becoming white-turbid or exhibiting a jelly form, and the temperature at that time is referred to as the gel point of the solvent usable in the present invention. The solvent usable in the present invention has a gel point. Reference examples of such a solvent are shown in Table 1.

TABLE 1

| Name of solvent | B.P. (°C.) | Dissolution temp. | Gel point (°C.) | Note |
|---|---|---|---|---|
| Toluene | 110.0 | 56–57 | 45–43 | Industrial use |
| Xylene | 135–145 | 89 | 48–40 | |
| n-Hexane | 68.7 | Insoluble | — | |
| Methanol | 64.7 | Insoluble | — | |
| Ethyl acetate | 77.1 | 76–77 | 75 | |

TABLE 1-continued

| Name of solvent | B.P. (°C.) | Dissolution temp. | Gel point (°C.) | Note |
|---|---|---|---|---|
| Methyl ethyl ketone | 79.6 | Insoluble | — | |
| Tetrachloroethylene | 121.2 | Insoluble | — | |
| Trichloroethylene | 87.2 | 58 | 38–35 | |
| 1,2-Dichloroethane | 83.7 | 55 | None | |
| Chloroform | 61.2 | 45 | 25–24 | |
| Dichloromethane | 83.7 | 38 | None | |
| Ethylchlorohydrin | 128.0 | 50–51 | None | |
| Benzyl chloride | 132.2 | 57–58 | 24—24 | |

(2) Dissolving-out-promoting effectiveness of filler 1) FIG. 1 shows a flowsheet illustrating a spout-coating apparatus employed for producing sample products of Example 1 and Example 2. Numeral 1 shows a spouting column having a column diameter of 200 mm, a height of 1,500 mm, a diameter of air-spouting port of 45 mm and a cone angle of 50°, and also having a fertilizer-feeding port 2 and an exhaust gas-discharging pot 3. The spouting air is sent from blower 10 via orifice flowmeter 9 and heat-exchanger 8 to the spouting column, and the flow quantity and the temperature are controlled by the flowmeter and the heat-exchanger, respectively and the exhaust gas is discharged from the discharging port 3 to the outside of the column. A granular fertilizer to be coated is fed from fertilizer-feeding port 2 while a definite quantity of hot air is passed, to form a spout. The hot air temperature, the particle temperature during coating and the exhaust gas temperature are detected by thermometers $T_1$, $T_2$ and $T_3$, respectively. When the temperature of $T_2$ has reached a definite temperature, a coating solution is blown through a one-flow nozzle 4 toward the spout in the form of spray. The coating solution is in advnace prepared by agitation in liquid tank 11, and when a powder is used, the powder is agitated so that it can be uniformly dispersed in the coating solution. The coating solution is sent via pump 6 to the nozzle and at that time, it is heated by steam so that its temperature cannot lower down to 80° C. or lower. When the percentage coating has reached a definite value, the blower is stopped and the resulting coated fertilizer is withdrawn through withdrawing port 7.

Preparation of the samples of this Example was carried out under the following conditions:
Solvent: trichloroethylene
One-flow nozzle: opening 0.8 mm, full cone type
Quantity of air: 2.5 m³/min.
Temperature of hot air: 95° C.±3° C.
(At the inlet of the spouting column)
Kind of fertilizer: granular urea of 5 ~ 8 meshes
Quantity of fertilizer fed: 3 Kg
Concentration of coating solution: solid content 2% by weight
Quantity of coating solution fed: 0.2 Kg/min.
Feeding period of coating solution: 38 min.
Percentage coating: 5% (based on fertilizer)
2) Measurement of percentage dissolving-out
The percentage dissolving-out of the test samples was sought according to the following method:
A sample (10 g) is immersed in water (200 ml) and the whole is sealed and allowed to stand still at 25° C. After a definite period, the sample is separated from water and the quantity of urea dissolved out in water is sought by quantitative analysis. The percentage of the quantity of urea dissolved out in water relative to the total quantity of urea in the sample to be tested is made a percentage dissolving-out.

$$\text{Percentage dissolving-out} = \frac{\text{Quantity of urea dissolved out in water}}{\text{Total quantity of urea in sample}} \times 100(\%)$$

The resulting sample (coated urea) after the measurement of the percentage dissolving-out is again immersed in fresh water (200 ml) and allowed to stand still at 25° C., followed by again seeking the percentage dissolving-out in the same manner as above.

A graph is prepared wherein the number of days of still standing is plotted along the abscissa axis and the cumulative total of the percentage of dissolving-out is plotted along the ordinate axis, followed by connecting the resulting points to obtain a curve of the percentage dissolving-out.

3) The coating materials to be tested and the coating conditions are as follows:

TABLE 2

| No. | Coating material tested (g) | | Coating condition | Note |
|---|---|---|---|---|
| | PHMP*1 | Filler | | |
| 1 | 150 | Talc*2 0 | Good | *1PHMP: Poly(3-hydroxy-3-methylpropionic acid) M.W. 750,000 *2Talc: 10μ diameter (average) |
| 2 | 110 | 40 | Good | |
| 3 | 75 | 75 | Good | |
| 4 | 50 | 100 | Good | |

Figures 1, 3:
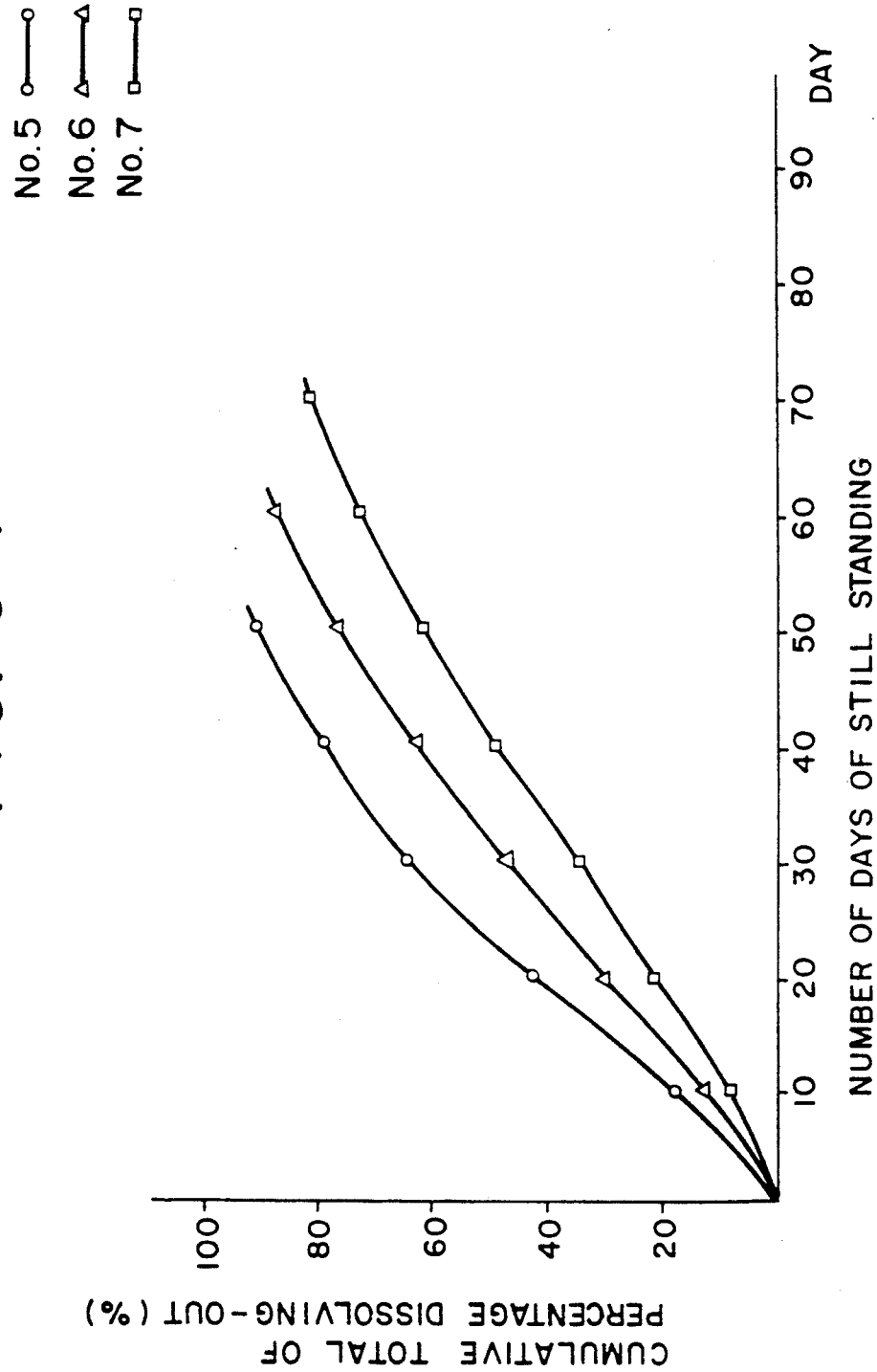
Figures 2, 3:
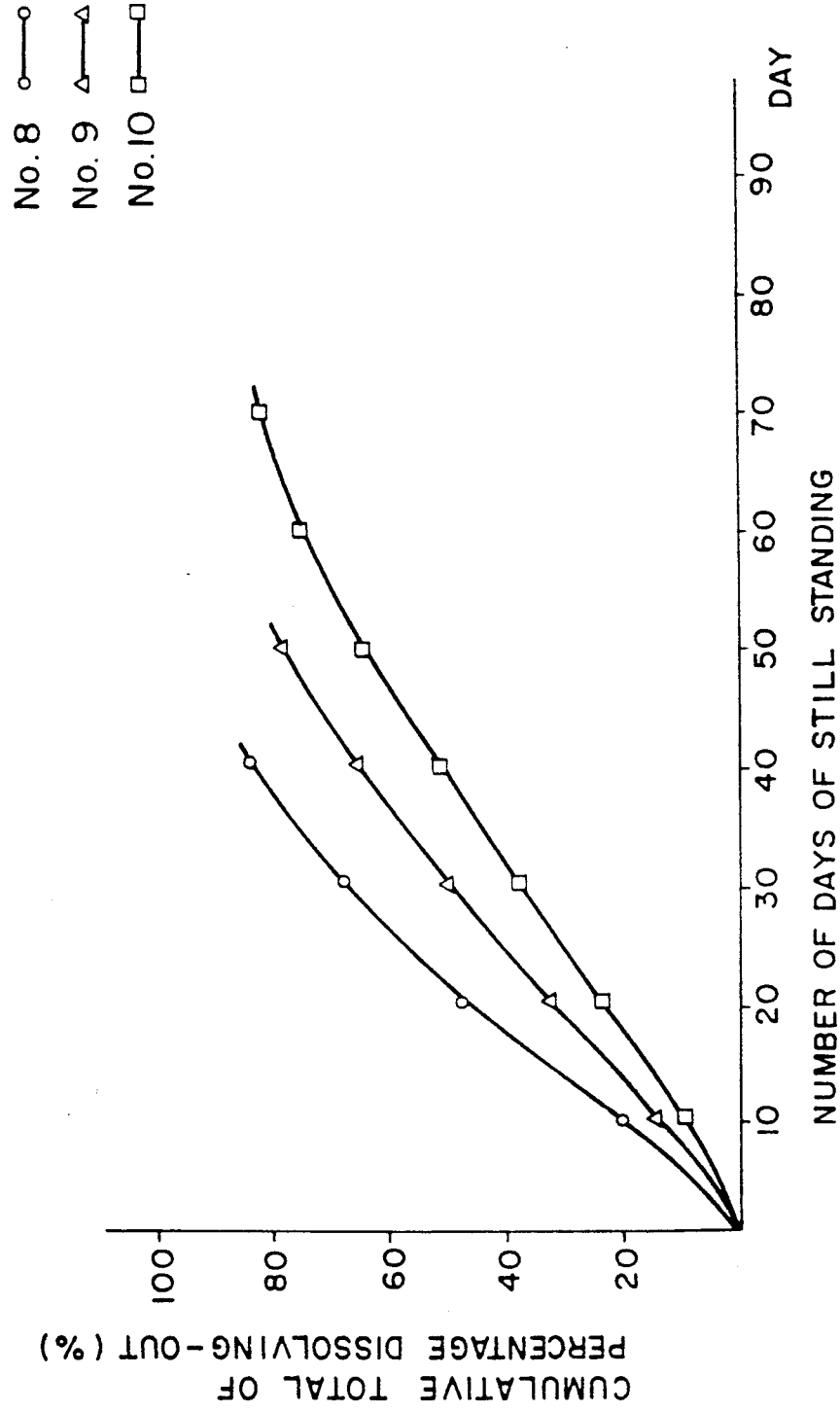

Further, the results of the measurement of the percentage dissolving-out are shown in FIG. 2.

(3) Examples of simultaneous use of fillers with waxes:

Preparation of samples and measurement of percentage dissolving-out were carried out as in the item (2). The coating materials tested and the coating conditions are shown in Table 3 and the results of measurement of percentage dissolving-out are shown in FIGS. 3-1 and 3-2.

TABLE 3

| No. | Coating material tested (g) | | | Coating Condition | Note |
|---|---|---|---|---|---|
| | PHMP*1 | Wax | Filler | | |
| 5 | 70 | Paraffin*2 5 | Talc*3 75 | Good | *1PHMP: Same as in Table 2 |
| 6 | 60 | 15 | Talc*3 75 | Good | *2Paraffin: m.p. 69~73° C. wax |
| 7 | 50 | 25 | Talc*3 75 | Good | *3Talc: Same as in Table 2 |
| 8 | 70 | Hardened oil*4 5 | CaCo3*5 75 | Good | *4Hardened oil: (Hardened castor oil) m.p. 84° C. |
| 9 | 60 | 15 | CaCo3*5 75 | Good | *5CaCO3: |
| 10 | 50 | 25 | CaCo3*5 75 | Good | calcium carbonate, 5μ diameter (average) |

(4) Examples of simultaneous use of fillers with high-molecular materials:

In the present examples, since a combustible solvent is used, a piping for $N_2$ gas separated by air cooling is arranged onto blower 10 and spouting and coating were carried out with $N_2$ gas in place of air. Conditions of sample preparation are as follows:

Solvent: toluene
Nozzle: opening 0.8 mm, full cone type (one-fluid nozzle)
Quantity of $N_2$: 2.5 m³/min.
Temperature of $N_2$: 100° C. ±3° C.
(at the inlet of spouting column)
Kind of fertilizer: granular urea of 5~8 meshes
Quantity of fertilizer fed: 3 Kg
Concentration of coating solution: solid content 2% by weight
Quantity of coating solution fed: 0.15 Kg/min.
Feeding period of coating solution: 50 min.
Percentage coating: 5% (based on fertilizer)

Measurement of the percentage dissolving-out of test samples was carried out in the same manner as in the item (2). The coating materials tested and the coating condition are shown in Table 4 and the results of measurement of percentage dissolving-out are shown in FIG. 4.

TABLE 4

| No. | Coating material tested (g) | | | Coating condition | Note |
|---|---|---|---|---|---|
| | PHMP*1 | High-molecular material | Filler | | |
| 11 | 105 | 0 | White carbon*2 45 | Good | *1PHMP: Same as in Table 2 *2White carbon: particle diameter 5μ (average) |
| 12 | 60 | PE*3 15 | White carbon*2 45 | Good | *3PE: polyethylene MI = 40 d = 0.922 |
| 13 | 45 | PE*3 30 | White carbon*2 45 | Good | |
| 14 | 30 | PE*3 45 | White carbon*2 45 | Good | *4Al2O3: particle diameter 10μ (average) |
| 15 | 60 | 0 | Al2O3*4 90 | Good | *5PS: polystyrene MI = 30 d = 1.04 |
| 16 | 45 | PS*5 15 | Al2O3*4 90 | Good | |
| 17 | 30 | PS*5 30 | Al2O3*4 90 | Good | |

(5) Dissolving-out in soil and decomposition in soil of coating:

(1) Dissolving-out in soil:

Soil in rice paddies (sand soil in Naganocho, Minamatashi, Japan) is air-dried and sieved by a sieve of 10 meshes and the resulting undersize was tested. A sample of the coated granular fertilizer of the present invention (2 g) was mixed with the dried soil (250 g), followed by placing the mixture in a 500 ml polyethylene bottle, adding 150% of the maximum volume water quantity to form a state of rice paddies and allowing the resulting material to stand still at 25° C. After a definite period, the total quantity of the soil containing the sample is transferred onto a sieve of 10 meshes and sieved in water to separate the sample from the soil. The respective granules of the sample remaining on the sieve are each carefully picked up, followed by transferring the total quantity into a mortar, triturating it, placing the triturated material in a measuring flask, filling water up to the marked line thereof, filtering off the urea solution, and analyzing urea contained in the resulting solution to seek the total quantity of urea remaining in the coating.

The percentage dissolving-out in the soil is calculated according to the following equation:

Percentage of dissolving-out in the soil =

$$\frac{\begin{pmatrix}\text{Total urea in}\\\text{sample tested}\end{pmatrix} - \begin{pmatrix}\text{total urea remaining}\\\text{in coating}\end{pmatrix}}{\text{Total urea in sample tested}} \times 100$$

Figure 5:
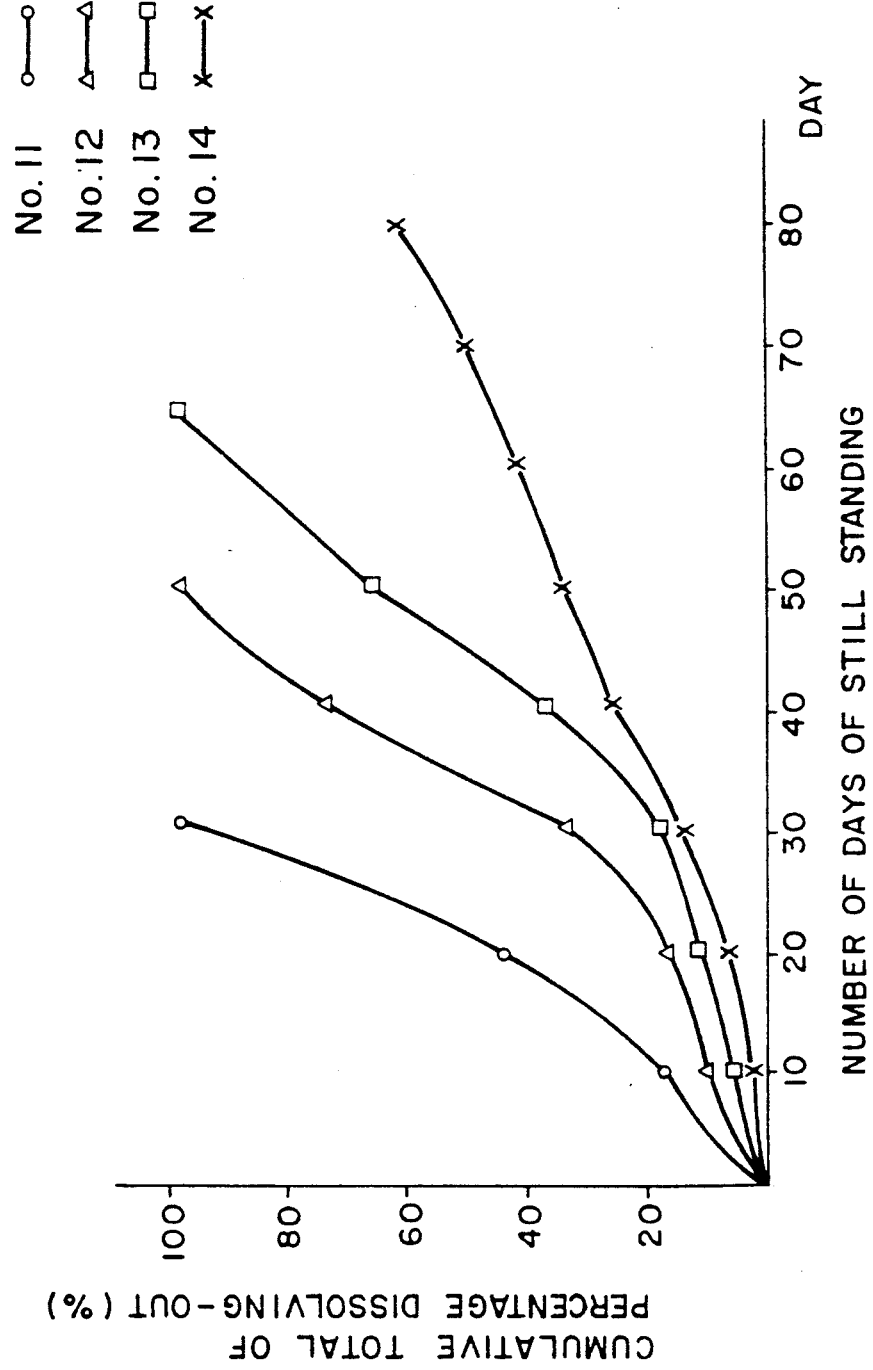

The test results of samples No. 11 ~ 14 are shown in FIG. 5.

2) Decomposition test of coating in soil:

Samples (each 5 g) were taken from the respective fertilizers of the present invention and were each stung by a needle with a sharp tip to form a pinhole, followed by allowing the resulting granules to stand still in water at 30° C. for 2 weeks to have urea in the coating dissolved out and thereby prepare hollow capsules. The hollow capsules are separated from the resulting solution obtained by dissolving-out and mixed with dry soil (400 g) used in item (1), followed by adding water so as to give 60% of the maximum volume water content, covering the resulting mixture with a polyvinylidene film and allowing it to stand still in a constant temperature bath at 30° C. This is dug out each two months to observe the condition of the capsules, during which vaporized water content is corrected and the procedure is continued. The resulting observation conditions are shown in Table 5.

TABLE 5

| Sample No. | Condition of capsule embedded in soil |
|---|---|
| 1 | After lapse of 2 months, there was almost no trace. |
| 3 | After lapse of 2 months, there was a white trace, but capsule did not remain in its form. |
| 6 | Sample as in the case of sample No. 3. |
| 9 | Sample as in the case of sample No. 3. |
| 11 | Sample as in the case of sample No. 3. |
| 12 | After lapse of 2 months, fungi have propagated in part, but no degradation of capsule occurred. After lapse of 4 months, capsules became utterly fragile, and when external-force was applied, it crumbled. |
| 13 | After lapse of 4 months, capsules remained in the original form, but after lapse of 6 months hole corrosion was observed on the total |

TABLE 5-continued

| Sample No. | Condition of capsule embedded in soil |
|---|---|
| | surface of capsules. |
| 14 | After 6 months, no change occurred. |

Figure 6:
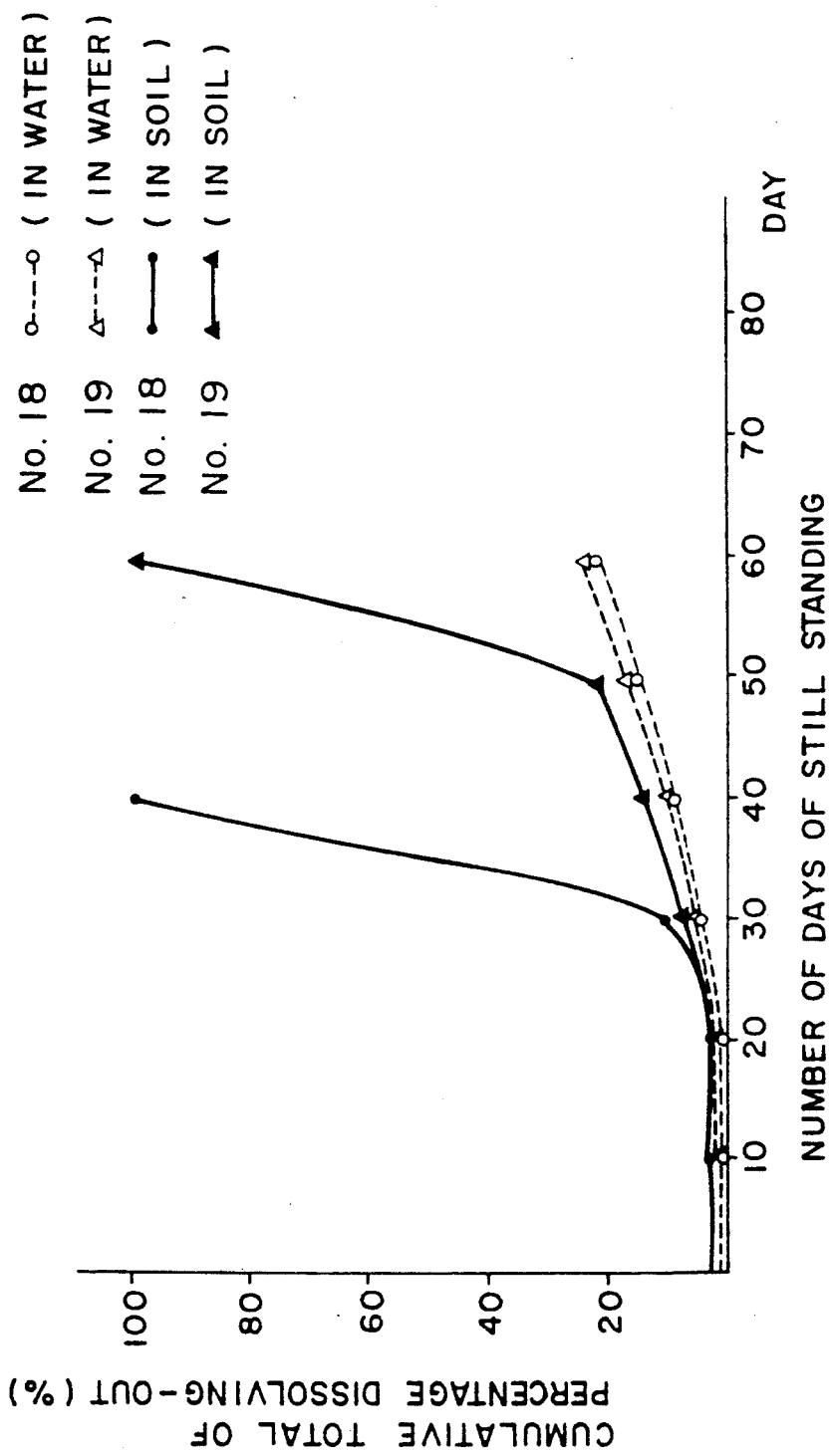

(6) Among the sample preparation conditions in (2) -1), the period of the coating solution fed was extended to 76 minutes (twice) to increase the percentage coating to 10% (based on the fertilizer). Using the resulting material as raw material shown in Table 6, samples were prepared. The percentages dissolving-out in water of these samples were sought according to the method of (2) -2) and the percentages dissolving-out in soil thereof were sought according to the method of (5) -1). Both the percentages dissolving-out are shown in FIG. 6.

TABLE 6

| Sample No. | Coating material tested (g) | | cide | Coating condition | Note |
|---|---|---|---|---|---|
| | PHMP*1 | Filler | | | |
| 18 | 220 | Talc*2 80 | 0 | Good | *1PHMP: Same as in Table 2 |
| 19 | 220 | Talc*2 80 | *3 3 | Good | *2Talc: 10μ diameter (average) *3Ethylene-bis-(thiocarbamate)-maneganese |

EXAMPLE 2

I. Production example of the fertilizer of the present invention

FIG. 1 shows a flowsheet illustrating a spout-coating apparatus employed in Example 1 and Example 2. Numeral 1 shows a spouting column having a column diameter of 250 mm, a height of 1,200 mm, a diameter of air-spouting port of 50 mm and a cone angle of 50°, and also having a fertilizer-feeding port 2 and an exhaust gas-discharging port 3. The spouting air is sent from blower 10 via orifice flowmeter 9 and heat-exchanger 8 to the spouting column, and the flow quantity and the temperature are controlled by the flowmeter and the heat-exchanger, respectively and the exhaust gas is discharged from the discharging port 3 to the outside of the column. A granular fertilizer to be coated is fed from fertilizer-feeding port 2 while a definite quantity of hot air is passed, to form a spout. The hot air temperature, the particle temperature during coating and the exhaust gas temperature are detected by thermometers $T_1$, $T_2$ and $T_3$, respectively. When the temperature of $T_2$ has reached a definite temperature, a coating solution is blown through a one-flow nozzle 4 toward the spout in the form of spray. The coating solution is in advance prepared by agitation in liquid tank 11, and when a powder is used, the powder is agitated so that it can be uniformly dispersed in the coating solution. The coating solution is sent via pump 6 to the nozzle and at that time, it is heated by steam so that its temperature cannot lower down to 100° C. or lower. When the percentage coating has reached a definite value, the blower is stopped and the resulting coated fertilizer is withdrawn through withdrawing port 7.

Preparation of the samples of this Example was carried out under the following conditions:
One-flow nozzle: opening 0.8 mm, full cone type
Quantity of hot air: 4 m³/min
Temperature of hot air: 100° C.±2° C.

Kind of fertilizer: granular urea of 5 ~ 8 meshes
Quantity of fertilizer fed: 10 Kg
Concentration of coating solution: solid content 2.5% by weight
Kind of solvent tested: trichloroethylene
Quantity of coating solution fed: 0.5 Kg/min.
Feeding period of coating solution: 40 min.
Percentage coating: 5.0% (based on fertilizer)

In order to evidence control of the dissolving-out and degradativity of the capsules, samples shown in Table 7 were prepared.

Further, for comparison, examples wherein 3-hydroxy-3-alkylpropionic acid polymer or a light-degradative resin was singly combined with a powder are together shown in Table 7.

II. Measurement example of percentage dissolving-out of the present invention:

The respective fertilizers of the present invention prepared in item (I) (each, 10 g) are immersed in water (200 ml) and allowed to stand still at 25° C. After a definite period, the fertilizer is separated from water and the quantity of urea dissolved out in water is sought by quantitative analysis. Fresh water (200 m()) is added to the resulting fertilizer, followed by allowing the whole to stand still at 25° C. and after a definite period, carrying out the same analysis. Such a procedure is repeated, and the relationship between the cumulative total of the percentage dissolving-out of urea dissolved out in water and the number of days is graphed to prepare a curve of dissolving-out rate, whereby it is possible to find the number of days at which the percentage dissolving-out reaches 80%.

The "24 Hrs dissolving-out %" in the item "dissolving-out" in Table 7 refers to a percentage dissolving-out in water at 25° C. after lapse of 24 hours in the above-mentioned measurement of percentage dissolving-out, and the "80% dissolving-out days" therein was sought by preparing a dissolving-out rate curve based on the above percentage dissolving-out.

As seen from Table 7, any of the products of the present invention have a small percentage dissolving-out in water after 24 hours and are well capsulated. Further, it is also seen that the 80% dissolving-out days can be controlled depending on the proportion of 3-hydroxy-3-alkylpropionic acid polymer to the light-degradative resin and also depending on the mixing proportion of powder.

III. Example of measurement of capsule degradativity

Each (5 g) of the fertilizers prepared in the item (I) was subjected to preparation of a pinhole each granule with a needle, followed by allowing the resulting granules to stand still in water, whereby the inside urea is completely dissolved out to prepare hollow capsules, which are then dried to prepare samples to be tested.

Dried sand of 12 meshes-pass is placed in a square box of polyvinyl chloride of 15 cm long, 15 cm wide and 15 cm high so as to be almost full of the sand, followed by arranging the purified hollow capsules on the surface of the sand, fitting a quartz sheet of 2 mm thick onto the box so as to prevent rain, allowing the resulting box to stand outdoors over six months (since April till September), thereafter placing the total quantity of the sand and the capsules in a V type mixer provided with rotating blades, mixing them with stirring for 30 minutes, thereafter separating the capsules from the sand with a sieve of 10 meshes and seeking the percentage of 10 meshes-on capsules relative to the sample capsules. This percentage is referred to as degree of degradation and shown in Table7.

TABLE 7

| RUN NO. | | Coating material (wt. %) | | | | | | Dissolving-out (25° C., in water) | | Degree of degradation (%) |
| --- | --- | --- | --- | --- | --- | --- | --- | --- | --- | --- |
| | | Resin A | Resin B | Resin C | Resin D | Others | Filler | 24 Hrs. dissolving out % | 80% dissolving-out days | |
| Example sample | 20 | 30 | | | | | 0 | 0.1 or less | 320 | 92 |
| | 21 | 50 | 50 | | | | 0 | 0.1 or less | 112 | 89 |
| | 22 | 70 | 30 | | | | 0 | 0.1 | 87 | 83 |
| | 23 | 12 | 28 | | | | Talc 60 | 0.1 | 66 | 99 or more |
| | 24 | 20 | 20 | | | | Talc 60 | 0.3 | 43 | 99 or more |
| | 25 | 28 | 12 | | | | Talc 60 | 0.3 | 26 | 99 or more |
| | 26 | 12 | 20 | | | Wax 8 | Talc 60 | 0.8 | 51 | 99 or more |
| | 27 | 30 | | 10 | | | Talc 60 | 3.9 | 15 | 99 or more |
| | 28 | 30 | | | 10 | | Talc 60 | 2.3 | 19 | 99 or more |
| Comp. sample | 1 | 0 | | 40 | | | Talc 60 | 0.2 | 110 | 98 |
| | 2 | 40 | | 0 | | | Talc 60 | 0.4 | 15 | 5 |

Resin A: 3-hydroxy-3-methyl-propionic acid polymer
Resin B: ethylene-carbon monoxide copolymer
Resin C: ethylene-carbon monoxide-vinyl acetate terpolymer
Resin D: 1,2-syndiotactic polybutadiene IV. Decomposition test of coating in soil:

Samples (each 5 g) were taken from the respective fertilizers of the present invention and each stung by a needle with a sharp tip to form a pinhole, followed by allowing the resulting granules to stand still in water at 30° C. for 2 weeks to have urea in the coating dissolved out and thereby prepare hollow capsules. The empty capsules are separated from the resulting solution obtained by dissolving-out and mixed with dry soil (400 g) used in item (5)-1 of Example 1, followed by adding water so as to give 60% of the maximum volume water content, covering the resulting mixture with a polyvinylidene film and allowing it to stand still in a constant temperature bath at 30° C. This is dug out each two months to observe the condition of the capsules, during which vaporized water content is corrected and the procedure is continued. The resulting observation conditions are shown in Table 8.

TABLE 8

| No. | | Condition of capsule embedded in soil |
|---|---|---|
| Example sample | 20 | After lapse of 4 months, capsule remained in the original form as it was, but after lapse of 6 months, hole corrosion was observed on the whole surface of capsule. |
| | 21 | Sample as in sample No. 20 |
| | 22 | After lapse of 2 months, capsule remained in the original form as it was, but after lapse of 4 months, capsule became utterly fragile, and when external force was applied, it crumbled. |
| | 23 | Same as in sample No. 22. |
| | 24 | After lapse of 2 months, there was a white trace, but capsule did not remain in its form. |
| | 25 | Same as in sample No. 24. |
| | 26 | Same as in sample No. 24. |
| | 27 | Same as in sample No. 24. |
| | 28 | Same as in sample No. 24. |
| Compar. sample | 1 | After lapse of 6 months, no change occurred. |
| | 2 | After lapse of 2 months, there was a white trace, but capsule did not remain in its form. |

What we claim is:

1. A granular fertilizer the surface of which is provided with a decomposable coating said coating comprising a microorganism and light-degradative resin composition that contains a poly-3-hydroxy-3-methylpropionic acid or a poly-3-hydroxy-3-ethylpropionic acid as a soil microorganism-decomposable ingredient for the coating, the ratio by weight of the poly-3-hydroxy-3-methylpropionic acid or poly-3-hydroxy-3-ethylpropionic acid to said light-degradative resin composition being 0.1 to 0.9 when the material for the coating consists only of these two kinds of material.

2. A granular fertilizer according to claim 1 wherein said decomposable coating contains poly-3-hydroxy-3-methylpropionic acid.

3. A granular fertilizer according to claim 1 wherein said decomposable coating also contains at least one member selected from the group consisting of as resins, polyvinylidene chloride, olefin polymer resins, rubbery resins, ethylene-vinyl acetate polymer, polystyrene, polymethyl methacrylate, ethylenecarbon monoxide copolymer, ethylene-vinyl acetate-carbon monoxide terpolymer, ethylene-ethyl acrylate copolymer and ethylenemethacrylic acid copolymer and as low molecular resinous substances, paraffin, hardened oils, solid fatty acids, metal salts thereof, beeswax, Japan wax, petroleum resins and rosins.

4. A granular fertilizer according to claim 3 wherein said decomposable coating also includes an inorganic or organic, difficulty water-insoluble powder.

5. A granular fertilizer according to claim 3 which further includes a powder of talc, clay, silica, diatomaceous earth, metal oxides, sulfur, starch or crotylidene diurea.

6. A fertilizer according to claim 3 wherein said coating is 20–200 μ thick.

7. A fertilizer according to claim 3 wherein said ingredient has a molecular weight of 10,000–2,000,000.

8. A granular fertilizer according to claim 1 wherein said decomposable also includes an inorganic or organic difficulty water-soluble or water-insoluble powder.

9. A granular fertilizer according to claim 1 which also includes a powder of talc, clay, silica, diatomaceous earth, metal oxides, sulfur, starch or crotylidene diurea.

10. A fertilizer according to claim 1 wherein said coating is 20–200 μ thick.

11. A fertilizer according to claim 1 wherein said ingredient has a molecular weight of 10,000–2,000,000.

12. A process for producing a granular fertilizer coated with a decomposable coating said coating comprising a microorganism and light-degradative resin composition acid; which process comprises adding an organic solvent solution of a poly-3-hydroxy-3-methylpropionic acid or a poly-3-hydroxy-3-ethylpropionic acid in the form of a spray to a granular fertilizer in fluidized state, and when added, contacting a high speed hot air stream with said sprayed granular fertilizer to thereby instantaneously remove the solvent contained in said organic solvent solution and also to form a solid decomposable coating on the surface of said granular fertilizer, which coating contains said poly 3-hydroxy-3-alkylpropionic acid, the ratio by weight of the poly-3-hydroxy-3-methylpropionic acid or poly-3-hydroxy-3-ethylpropionic acid to said light-degradative resin composition being 0.1 to 0.9 when the material for the coating consists only of these two kinds of material.

13. A process according to claim 12, wherein in said organic solvent solution there is also dissolved at least one member selected from the group consisting of as resins, polyvinylidene chloride, olefin polymer resins, rubbery resins, ethylene-vinyl acetate copolymer, polystyrene, polymethyl methacrylate, ethylene-carbon monoxide copolymer, ethylene-vinyl acetate-carbon monoxide terpolymer, ethylene-ethyl acrylate copolymer and ethylene-methacrylic acid copolymer and as low molecular resinous substances, paraffin, hardened oils, solid fatty acids, metal salts thereof, beeswax, Japan wax, petroleum resins and rosins.

14. A fertilizer according to claim 13 wherein said coating is 20–200 μ thick.

15. A process according to claim 13 wherein in said organic solvent solution is further mixed and dispersed an inorganic or organic, difficulty water-soluble or water-insoluble powder.

16. A process according to claim 15 wherein said inorganic powder is talc, clay, silica, diatomaceous earth, metal oxides or sulfur and said organic powder is starch or crotylidene diurea.

17. A process according to claim 12 wherein in said organic solvent solution is further mixed and dispersed an inorganic or organic, difficulty water-soluble or water-insoluble powder.

18. A fertilizer according to claim 12 wherein said coating is 20–200 μ thick.

* * * * *